(12) United States Patent
Huske et al.

(10) Patent No.: US 8,738,694 B2
(45) Date of Patent: May 27, 2014

(54) METHOD OF AND SYSTEM FOR MANAGING CLIENT RESOURCES AND ASSETS FOR ACTIVITIES ON COMPUTING DEVICES

(75) Inventors: Tim Huske, Sunnyvale, CA (US); Mark J. Micheli, San Francisco, CA (US); Mark K. Berner, Santa Clara, CA (US); Matt Ford, Redwood City, CA (US); David B. Lockton, Carmel, CA (US)

(73) Assignee: Winview, Inc., Carmel, CA (US)

( * ) Notice: Subject to any disclaimer, the term of this patent is extended or adjusted under 35 U.S.C. 154(b) by 340 days.

(21) Appl. No.: 11/472,241

(22) Filed: Jun. 20, 2006

(65) Prior Publication Data

US 2007/0054695 A1 Mar. 8, 2007

Related U.S. Application Data

(60) Provisional application No. 60/692,356, filed on Jun. 20, 2005.

(51) Int. Cl.
G06F 15/16 (2006.01)
(52) U.S. Cl.
USPC .......................................... 709/204; 709/228
(58) Field of Classification Search
USPC .................................................. 709/204, 228
See application file for complete search history.

(56) References Cited

U.S. PATENT DOCUMENTS

| | | | |
|---|---|---|---|
| 4,141,548 A | 2/1979 | Everton | |
| 4,270,755 A | 6/1981 | Willhide et al. | |
| 4,496,148 A | 1/1985 | Morstain et al. | |
| 4,592,546 A | 6/1986 | Fascenda et al. | 273/1 E |
| 4,816,904 A | 3/1989 | McKenna et al. | 179/15 BS |
| 5,013,038 A | 5/1991 | Luxenberg | 273/439 |

(Continued)

FOREIGN PATENT DOCUMENTS

| | | | |
|---|---|---|---|
| CA | 2252021 | 11/1998 | G06F 3/023 |
| CA | 2252074 | 11/1998 | H04L 5/22 |

(Continued)

OTHER PUBLICATIONS

Nicolas Ducheneaut and Robert J. Moore, The Social Side of Gaming: A Study of Interaction Patterns in a Massively Multiplayer Online Game, Nov. 2004, Palo Alto Research Center, vol. 6.*

(Continued)

*Primary Examiner* — Tauqir Hussain
*Assistant Examiner* — Ebrahim Golabbakhsh
(74) *Attorney, Agent, or Firm* — Haverstock & Owens LLP

(57) ABSTRACT

A method of and system for enabling a distributed entertainment system over a computing device is described herein. When implementing a distributed entertainment system wherein the entertainment system is directly correlated to live events or televised programs, there are a number of issues that must be addressed such as differing timing and channels of television programs and separate state laws. Furthermore, there are a plethora of varying computing device models possibly requiring model-specific software. An "Activity Client" is provided to handle such concerns. Furthermore, since time is of the essence for activities based on live or televised events, it is necessary to ensure a computing device is able to receive the necessary updates for the program before the event begins. By providing only the needed components instead of entire data packages, the present invention is able to much more efficiently prepare users' computing devices in time.

28 Claims, 4 Drawing Sheets

(56) References Cited

U.S. PATENT DOCUMENTS

| | | | |
|---|---|---|---|
| 5,035,422 A | 7/1991 | Berman | 273/439 |
| 5,073,931 A | 12/1991 | Audebert et al. | 380/23 |
| 5,083,271 A | 1/1992 | Thacher et al. | 364/411 |
| 5,083,800 A | 1/1992 | Lockton | 273/439 |
| 5,120,076 A | 6/1992 | Luxenberg et al. | 273/439 |
| 5,213,337 A | 5/1993 | Sherman | 273/439 |
| 5,227,874 A | 7/1993 | Von Kohorn | 358/84 |
| 5,263,723 A | 11/1993 | Pearson et al. | 273/439 |
| 5,283,734 A | 2/1994 | Von Kohorn | 364/412 |
| 5,343,236 A | 8/1994 | Koppe et al. | 348/6 |
| 5,343,239 A | 8/1994 | Lappington et al. | 348/12 |
| 5,462,275 A | 10/1995 | Lowe et al. | 273/94 |
| 5,479,492 A | 12/1995 | Hofstee et al. | 379/92 |
| 5,553,120 A | 9/1996 | Katz | |
| 5,566,291 A | 10/1996 | Boulton et al. | |
| 5,585,975 A | 12/1996 | Bliss | |
| 5,586,257 A | 12/1996 | Perlman | 463/42 |
| 5,589,765 A | 12/1996 | Ohmart et al. | |
| 5,643,088 A | 7/1997 | Vaughn et al. | 463/40 |
| 5,761,606 A | 6/1998 | Wolzien | |
| 5,762,552 A | 6/1998 | Vuong et al. | 463/25 |
| 5,764,275 A | 6/1998 | Lappington et al. | 348/12 |
| 5,813,913 A | 9/1998 | Berner et al. | 463/40 |
| 5,838,774 A | 11/1998 | Weisser, Jr. | 379/92.02 |
| 5,860,862 A | 1/1999 | Junkin | 463/40 |
| 5,870,683 A | 2/1999 | Wells et al. | |
| 5,916,024 A | 6/1999 | Von Kohorn | |
| 5,970,143 A | 10/1999 | Schneier et al. | 380/23 |
| 5,971,854 A | 10/1999 | Pearson et al. | 463/41 |
| 5,987,440 A | 11/1999 | O'Neil et al. | 705/44 |
| 6,016,337 A | 1/2000 | Pykalisto | 379/92.02 |
| 6,117,013 A | 9/2000 | Eiba | |
| 6,126,543 A | 10/2000 | Friedman | |
| 6,174,237 B1 | 1/2001 | Stephenson | 463/42 |
| 6,182,084 B1 | 1/2001 | Cockrell et al. | 707/104 |
| 6,193,610 B1 | 2/2001 | Junkin | 463/40 |
| 6,222,642 B1 | 4/2001 | Farrell et al. | |
| 6,233,736 B1 | 5/2001 | Wolzien | |
| 6,293,868 B1 | 9/2001 | Bernard | |
| 6,312,336 B1 | 11/2001 | Handelman et al. | |
| 6,411,969 B1 | 6/2002 | Tam | |
| 6,416,414 B1 | 7/2002 | Stadelmann | |
| 6,425,828 B2 | 7/2002 | Walker et al. | 463/42 |
| 6,434,398 B1 | 8/2002 | Inselberg | |
| 6,524,189 B1 | 2/2003 | Rautila | |
| 6,530,082 B1 | 3/2003 | Del Sesto et al. | |
| 6,578,068 B1 | 6/2003 | Bowman-Amuah | 709/203 |
| 6,594,098 B1 | 7/2003 | Sutardja | |
| 6,604,997 B2 | 8/2003 | Saidakovsky et al. | 463/9 |
| 6,610,953 B1 | 8/2003 | Tao et al. | |
| 6,648,760 B1 | 11/2003 | Nicastro | 463/23 |
| 6,659,872 B1 | 12/2003 | Kaufman et al. | |
| 6,690,661 B1 | 2/2004 | Agarwal et al. | |
| 6,718,350 B1* | 4/2004 | Karbowski | 707/203 |
| 6,752,396 B2 | 6/2004 | Smith | |
| 6,758,754 B1 | 7/2004 | Lavanchy et al. | 463/42 |
| 6,760,595 B2 | 7/2004 | Inselberg | 455/517 |
| 6,763,377 B1 | 7/2004 | Belknap et al. | 709/223 |
| 6,774,926 B1* | 8/2004 | Ellis et al. | 348/14.01 |
| 6,785,561 B1 | 8/2004 | Kim | |
| 6,801,380 B1 | 10/2004 | Sutardja | |
| 6,807,675 B1 | 10/2004 | Maillard et al. | 725/35 |
| 6,817,947 B2 | 11/2004 | Tanskanen | 463/41 |
| 6,824,469 B2 | 11/2004 | Allibhoy et al. | 463/40 |
| 6,840,861 B2 | 1/2005 | Jordan et al. | 463/42 |
| 6,846,239 B2 | 1/2005 | Washio | |
| 6,857,122 B1* | 2/2005 | Takeda et al. | 718/107 |
| 6,863,610 B2 | 3/2005 | Vancraeynest | 463/41 |
| 6,871,226 B1* | 3/2005 | Ensley et al. | 709/224 |
| 6,873,610 B1 | 3/2005 | Noever | |
| 6,884,172 B1 | 4/2005 | Lloyd et al. | |
| 6,887,159 B2 | 5/2005 | Leen et al. | 463/42 |
| 6,893,347 B1 | 5/2005 | Zilliacus et al. | |
| 6,942,574 B1 | 9/2005 | LeMay et al. | 463/41 |
| 6,960,088 B1 | 11/2005 | Long | |
| 7,035,653 B2 | 4/2006 | Simon et al. | |
| 7,116,310 B1 | 10/2006 | Evans et al. | |
| 7,125,336 B2 | 10/2006 | Anttila et al. | |
| 7,169,050 B1 | 1/2007 | Tyler | |
| 7,194,758 B1 | 3/2007 | Waki et al. | |
| 7,254,605 B1 | 8/2007 | Strum | 709/203 |
| 7,288,027 B2 | 10/2007 | Overton | |
| 7,347,781 B2 | 3/2008 | Schultz | |
| 7,351,149 B1 | 4/2008 | Simon et al. | |
| 7,379,705 B1 | 5/2008 | Rados et al. | |
| 7,502,610 B2 | 3/2009 | Maher | |
| 7,517,282 B1 | 4/2009 | Pryor | |
| 7,562,134 B1 | 7/2009 | Fingerhut et al. | |
| 7,630,986 B1 | 12/2009 | Herz et al. | |
| 7,907,211 B2 | 3/2011 | Oostveen et al. | |
| 8,006,314 B2 | 8/2011 | Wold | |
| 8,082,150 B2 | 12/2011 | Wold | |
| 8,086,445 B2 | 12/2011 | Wold et al. | |
| 8,107,674 B2 | 1/2012 | Davis et al. | |
| 8,176,518 B1 | 5/2012 | Junkin et al. | |
| 2001/0004609 A1 | 6/2001 | Walker et al. | |
| 2001/0005670 A1 | 6/2001 | Lahtinen | |
| 2001/0020298 A1* | 9/2001 | Rector et al. | 725/50 |
| 2002/0010789 A1 | 1/2002 | Lord | |
| 2002/0042293 A1 | 4/2002 | Ubale et al. | |
| 2002/0054088 A1 | 5/2002 | Tanskanen et al. | 345/744 |
| 2002/0056089 A1 | 5/2002 | Houston | 725/9 |
| 2002/0059623 A1* | 5/2002 | Rodriguez et al. | 725/91 |
| 2002/0078176 A1 | 6/2002 | Nomura et al. | |
| 2002/0103696 A1 | 8/2002 | Huang et al. | |
| 2002/0108125 A1* | 8/2002 | Joao | 725/139 |
| 2002/0108127 A1 | 8/2002 | Lew et al. | |
| 2002/0124247 A1 | 9/2002 | Houghton | 725/9 |
| 2002/0132614 A1 | 9/2002 | Vanluijt et al. | |
| 2002/0157002 A1 | 10/2002 | Messerges et al. | |
| 2002/0159576 A1 | 10/2002 | Adams | |
| 2002/0162031 A1 | 10/2002 | Levin et al. | |
| 2002/0177483 A1 | 11/2002 | Cannon | |
| 2003/0013528 A1 | 1/2003 | Allibhoy et al. | |
| 2003/0040363 A1 | 2/2003 | Sandberg | |
| 2003/0069828 A1 | 4/2003 | Blazey et al. | 705/37 |
| 2003/0070174 A1* | 4/2003 | Solomon | 725/98 |
| 2003/0078924 A1 | 4/2003 | Liecchty et al. | |
| 2003/0086691 A1 | 5/2003 | Yu | |
| 2003/0114224 A1 | 6/2003 | Anttila et al. | |
| 2003/0144017 A1 | 7/2003 | Inselberg | 455/517 |
| 2003/0154242 A1* | 8/2003 | Hayes et al. | 709/203 |
| 2003/0177504 A1* | 9/2003 | Paulo et al. | 725/118 |
| 2003/0211856 A1 | 11/2003 | Zilliacus | |
| 2003/0212691 A1 | 11/2003 | Kuntala et al. | |
| 2003/0216185 A1 | 11/2003 | Varley | |
| 2003/0216857 A1 | 11/2003 | Feldman et al. | |
| 2004/0014524 A1 | 1/2004 | Pearlman | |
| 2004/0022366 A1 | 2/2004 | Ferguson et al. | |
| 2004/0060063 A1 | 3/2004 | Russ et al. | |
| 2004/0088729 A1 | 5/2004 | Petrovic et al. | |
| 2004/0093302 A1 | 5/2004 | Baker et al. | 705/37 |
| 2004/0117831 A1 | 6/2004 | Ellis et al. | |
| 2004/0117839 A1* | 6/2004 | Watson et al. | 725/87 |
| 2004/0148638 A1 | 7/2004 | Weisman et al. | |
| 2004/0152454 A1 | 8/2004 | Kauppinen | |
| 2004/0158855 A1* | 8/2004 | Gu et al. | 725/39 |
| 2004/0178923 A1 | 9/2004 | Kuang | 340/825.72 |
| 2004/0198495 A1 | 10/2004 | Cisneros et al. | 463/24 |
| 2004/0203667 A1 | 10/2004 | Schroeder et al. | |
| 2004/0203898 A1* | 10/2004 | Bodin et al. | 455/456.1 |
| 2004/0224750 A1 | 11/2004 | Al-Ziyoud | 463/17 |
| 2004/0242321 A1 | 12/2004 | Overton | 463/29 |
| 2005/0026699 A1 | 2/2005 | Kinzer et al. | |
| 2005/0060219 A1 | 3/2005 | Deitering et al. | |
| 2005/0076371 A1* | 4/2005 | Nakamura | 725/75 |
| 2005/0097599 A1* | 5/2005 | Plotnick et al. | 725/32 |
| 2005/0101309 A1* | 5/2005 | Croome | 455/418 |
| 2005/0113164 A1 | 5/2005 | Buecheler et al. | |
| 2005/0131984 A1* | 6/2005 | Hofmann et al. | 709/201 |
| 2005/0210526 A1 | 9/2005 | Levy et al. | |
| 2005/0235043 A1* | 10/2005 | Teodosiu et al. | 709/217 |
| 2005/0255901 A1 | 11/2005 | Kreutzer | |
| 2005/0266869 A1 | 12/2005 | Jung | |

(56) References Cited

U.S. PATENT DOCUMENTS

| | | | |
|---|---|---|---|
| 2005/0273804 A1 | 12/2005 | Preisman | |
| 2005/0288812 A1 | 12/2005 | Cheng et al. | |
| 2006/0025070 A1* | 2/2006 | Kim et al. | 455/3.02 |
| 2006/0047772 A1* | 3/2006 | Crutcher | 709/212 |
| 2006/0059161 A1 | 3/2006 | Millett et al. | 707/10 |
| 2006/0089199 A1 | 4/2006 | Jordan et al. | |
| 2006/0135253 A1 | 6/2006 | George et al. | |
| 2006/0148569 A1 | 7/2006 | Beck | |
| 2006/0156371 A1* | 7/2006 | Maetz et al. | 725/132 |
| 2006/0174307 A1 | 8/2006 | Hwang et al. | |
| 2006/0205483 A1 | 9/2006 | Meyer et al. | |
| 2006/0248553 A1 | 11/2006 | Mikkelson et al. | |
| 2006/0269120 A1 | 11/2006 | Nehmadi et al. | |
| 2007/0004516 A1 | 1/2007 | Jordan et al. | |
| 2007/0019826 A1 | 1/2007 | Horbach et al. | |
| 2007/0083920 A1* | 4/2007 | Mizoguchi et al. | 726/9 |
| 2007/0106721 A1 | 5/2007 | Schloter | |
| 2007/0174870 A1* | 7/2007 | Nagashima et al. | 725/40 |
| 2007/0226062 A1 | 9/2007 | Hughes et al. | |
| 2007/0238525 A1 | 10/2007 | Suomela | |
| 2007/0243936 A1 | 10/2007 | Binenstock et al. | |
| 2007/0244570 A1 | 10/2007 | Speiser et al. | |
| 2007/0244585 A1 | 10/2007 | Speiser et al. | |
| 2007/0244749 A1 | 10/2007 | Speiser et al. | |
| 2008/0076497 A1 | 3/2008 | Kiskis et al. | |
| 2008/0270288 A1 | 10/2008 | Butterly et al. | |
| 2008/0288600 A1 | 11/2008 | Clark | |
| 2009/0163271 A1 | 6/2009 | George et al. | |
| 2009/0234674 A1* | 9/2009 | Wurster | 705/3 |
| 2010/0099421 A1 | 4/2010 | Patel et al. | |
| 2010/0099471 A1 | 4/2010 | Feeney et al. | |
| 2013/0005453 A1 | 1/2013 | Nguyen et al. | |

FOREIGN PATENT DOCUMENTS

| | | | |
|---|---|---|---|
| CA | 2279069 | 7/1999 | G06F 9/445 |
| CA | 2287617 | 10/1999 | H04N 7/173 |
| EP | 0 649 102 A3 | 6/1996 | G06F 17/00 |
| GB | 2364485 | 1/2002 | |
| JP | 11-46356 | 2/1999 | H04N 7/14 |
| JP | 11-239183 | 8/1999 | H04L 12/56 |
| JP | 2000-165840 | 6/2000 | H04N 7/16 |
| JP | 2000-209563 | 7/2000 | H04N 7/173 |
| JP | 2000-217094 | 8/2000 | H04N 7/173 |
| JP | 2000-358255 | 12/2000 | H04N 17/00 |
| JP | 2001-28743 | 1/2001 | H04N 7/173 |
| NZ | 330242 | 10/1998 | H04N 7/14 |
| WO | WO 01/65743 A1 | 9/2001 | H04H 1/00 |
| WO | 02/03698 A1 | 10/2002 | |

OTHER PUBLICATIONS

"Two Way TV Patent and Filing Map", www.twowaytv.com/version4/technologies/tech_patents.asp.

"Ark 4.0 standard edition, Technical Overview," www.twowaytv.com/version4/technologies/tech_ark_professional.asp.

"Understanding the Interactivity Between Television and Mobile Commerce", Robert Davis and David Yung, Communications of the ACM, Jul. 2005, vol. 48, No. 7, pp. 103-105.

"Re: Multicast Based Voting System," www.ripe.net/ripe/maillists/archives/mbone-eu-op/1997/msg00100html.

"IST and Sportal.com: Live on the Internet Sep. 14, 2004 by Clare Spoonheim", www.isk.co.usk/NEWS/dotcom/ist_sportal.html.

"Modelling User Behaviour in Networked Games by Tristan Henderson and Saleem Bhatti", www.woodworm.cs.uml.edu/rprice/ep/henderson.

"SMS Based Voting and Survey System for Meetings", www.abbit.be/technology/SMSSURVEY.htm.

"PurpleAce Launches 3GSM Ringtone Competition", www.wirelessdevnet.com/news/2005/jan/31/news6html.

"On the Performance of Protocols for Collecting Responses over a Multiple-Access Channel", Mostafa H. Ammar and George N. Rouskas, IEEE INFOCOM '91, pp. 1490-1499, vol. 3, IEEE, New York, NY.

Meriam-Webster, "Game" definition, <http://www.merriam-webstercom/dictionary/agme>p. 1.

* cited by examiner

METHOD OF AND SYSTEM FOR MANAGING CLIENT RESOURCES AND ASSETS FOR ACTIVITIES ON COMPUTING DEVICES

RELATED APPLICATION(S)

This Patent Application claims priority under 35 U.S.C. §119(e) of the co-owned U.S. Provisional Patent Application No. 60/692,356, filed Jun. 20, 2005, and entitled SYSTEMS AND METHODOLOGIES ENABLING A CELL PHONE BASED SUBSCRIPTION SERVICE OFFERING A VARIETY OF SCHEDULED GAMES IN CONNECTION WITH LIVE TELEVISION PROGRAMMING" which is also hereby incorporated by reference in its entirety.

This application is related to U.S. patent application Ser. No. 11/298,901, filed on Dec. 9, 2005 and entitled "A GAME OF SKILL PLAYED BY REMOTE PARTICIPANTS UTILIZING WIRELESS DEVICES IN CONNECTION WITH A COMMON GAME EVENT" and co-pending U.S. patent application Ser. No. 11/166,596, filed on Jun. 24, 2005 and entitled "METHODS AND APPARATUS FOR DISTRIBUTED GAMING OVER A MOBILE DEVICE" which claims priority under 35 U.S.C. §119(e) of the co-pending U.S. Provisional Patent Application Ser. No. 60/588,273, filed Jul. 14, 2004 and entitled "A METHODOLOGY FOR PROVIDING ALL CONTESTANTS IN GAMES OF SKILL PLAYABLE ON CELL PHONES WITH THEIR CURRENT STANDING WHILE RECEIVING GAME CONTROL INFORMATION ONE-WAY VIA A 'BROADCAST' TRANSMISSION," which are all incorporated by reference in their entirety.

FIELD OF THE INVENTION

The present invention relates to the field of distributed entertainment. More specifically, the present invention relates to the field of distributed entertainment utilizing a computing device where the entertainment corresponds to an event.

BACKGROUND OF THE INVENTION

In the United States alone there are over 170 million registered cell phones. With the expiration of the U.S. Pat. No. 4,592,546 to Fascenda et al., companies are able to now use the cell phone and other mobile communication devices utilizing a multicast network to control television viewers in games of skill based upon predicting, for example, what the quarterback may call on the next play. In addition, games of skill with a common start time can be conducted simultaneously among cell phone owners, based on classic card, dice, trivia, and other games. In order to avoid the anti-gaming laws in the various states, elements of chance must be virtually non-existent in such games and the winners therefore determined by the relative skill, experience and practice of the player in each discrete game. In certain jurisdictions and under certain circumstances, simultaneous games of chance can be conducted using the same technology as games of skill.

Although the ability to play games and enjoy other activities corresponding to current events on cell phones exists, there are a number of issues regarding coordinating the games across a nationwide network. Cellular networks and other networks are only able to handle a limited amount of traffic, so when millions of participants utilize the network at the same time for a regularly scheduled event, there are concerns of the network being overloaded and bogged down to a point where users do not receive necessary data in a timely manner.

Furthermore, cell phones and other computing devices have their own limitations as well. Although cell phone memory is increasing as is typical with technology, cell phones still have a limited amount of memory. Moreover, many users still have somewhat older cell phones that have less memory than current models. In addition to the memory limitations, there are multiple cell phone service providers and a plethora of cell phone models using slightly different protocols. Cell phone users are also sensitive to the time it takes to download the necessary data to play games or enjoy activities.

Servers of the entertainment provider also have limited resources yet must be able to ensure the potentially millions of simultaneous users have the necessary and proper software resident on their cell phones in order to participate in scheduled interactive programs. Again, servers are continuously growing more powerful, quicker and more stable; however there is still potential to overload a server with excessive traffic.

Additionally, other aspects of a nationwide service generate potential issues such as multiple time zones, differing timing and channels of television programs and separate state laws.

SUMMARY OF THE INVENTION

A method of and system for enabling a distributed entertainment system over a computing device is described herein. When implementing a distributed entertainment system wherein the entertainment system is directly correlated to live events or televised programs, there are a number of issues that must be addressed such as differing timing and channels of television programs and separate state laws. Furthermore, there are a plethora of varying computing device models possibly requiring model-specific software. An "Activity Client" is provided to handle such concerns. Furthermore, since time is of the essence for activities based on live or televised events, it is necessary to ensure a computing device is able to receive the necessary updates for the program before the event begins. By providing only the needed components instead of entire data packages, the present invention is able to much more efficiently prepare users' computing devices in time.

In one aspect, a method of implementing an entertainment service on computing devices comprises downloading an activity client to a computing device, loading a set of event information to the activity client, selecting an event to participate in from a list of possible events, downloading a set of activity-specific information from a server to the computing device and executing an application corresponding to the event on the computing device. The activity client is a program for managing activity information and data. The method further comprises selecting and registering with a television-related service. The method further comprises identifying a user status. Identifying the user status includes identifying a geographic location of the computing device. The activity client is specifically designed for the computing device. Executing the application is in real-time, synchronized with the event. The set of event information includes a schedule of available events. The schedule of available events includes a name of a television event, identification of an activity to be played with the television event, a television network and local channel offering the television event, a duration of the television event and information relating to nature of a prize related to the television event. The method further comprises displaying the set of event information. The set of event information is continually broadcast from the server and received at the computing device. The set of activity-specific information includes activity-specific instructions and information related to nature of the activity and event. An activity interpreter resident in the activity client is used to execute the application. The activity interpreter combines the activity, event and device instructions to execute the activity in realtime. The application is selected from the group consisting of a game, a survey and a poll. The computing device is a wireless device. The computing device is selected from the group consisting of a set-top box, a personal computer, a gaming console, a laptop computer, a cell phone, a PDA and a combination device. The method further comprises receiving a list of assets from the server, comparing the list of assets with a first set of assets on the computing device and receiving only a second set of assets within the list of assets that are not already resident on the computing device. The method further comprises improving efficiency by prioritizing the second set of assets. The second set of assets are grouped into a set of necessary assets and a set of preferred assets.

In another aspect, a method of receiving data on a client device to participate in a specific interactive event comprises receiving a list of assets from a server, comparing the list of assets with the assets on the client device and receiving only the assets within the list of assets that are not already resident on the client device. The method further comprises selecting an activity corresponding to an event from a menu of events. The activity is a game. The method further comprises requesting the list of assets from the server that are required to participate in the specific interactive event. The list of assets are sent from the server. The method further comprises requesting the assets not already on the client device. The method further comprises improving efficiency by prioritizing the assets. The assets are grouped into a set of necessary assets and a set of preferred assets. The client device is a wireless device. The client device is selected from the group consisting of a set-top box, a personal computer, a gaming console, a laptop computer, a cell phone, a PDA and a combination device.

In another aspect, a method of receiving data on a client device to participate in a specific interactive event comprises sending a request to a server from a client device to retrieve assets needed for an activity and concurrently sending a list of the assets currently resident on the client, comparing the list of resident assets sent by the client with a previously generated list of assets on the server and downloading a packet customized for the client containing only the assets missing on the client. The method further comprises improving efficiency by prioritizing the assets. The assets are grouped into a set of necessary assets and a set of preferred assets. The client device is a wireless device. The client device is selected from the group consisting of a set-top box, a personal computer, a gaming console, a laptop computer, a cell phone, a PDA and a combination device.

In yet another aspect, a system for receiving data to participate in a specific interactive event comprises a server and a client device coupled to the server for receiving a set of activity-specific data from the server wherein the client device comprises a memory for storing an activity client. The activity client is a program for managing activity information and data. The activity client further comprises an activity interpreter. A list of assets are utilized to determine which assets are downloaded to the activity client. A set of necessary assets are downloaded to the client device. The client device is a wireless device. The client device is selected from the group consisting of a set-top box, a personal computer, a gaming console, a laptop computer, a cell phone, a PDA and a combination device.

In another aspect, a client device comprises a communication interface, an activity client for receiving activity information through the communication interface and a display for displaying the activity information received by the activity client. The activity client is a program for managing activity information and data. The activity client further comprises an activity interpreter. The activity client receives a set of assets related to an application. The application is selected from the group consisting of a game, a survey and a poll. A list of assets are utilized to determine which assets are downloaded to the activity client. Only a set of necessary assets are downloaded to the activity client. The client device is selected from the group consisting of a set-top box, a personal computer, a gaming console, a laptop computer, a cell phone, a PDA and a combination device. The activity information comprises a schedule of upcoming events, is device-specific, is geographic-specific and is activity-specific. A user navigates and selects an event from the schedule of upcoming events.

In another aspect, a server device is configured to communicate with client devices in a plurality of locations wherein the server device provides location-specific activity information to the client devices, wherein the client devices each store an activity client. The server device comprises a communications interface for communicating with the client devices, an asset module for determining which assets each client device needs and a distributing module for sending the assets needed to each client device. The activity client is a program for managing activity information and data. The activity information comprises a schedule of upcoming events. The schedule of upcoming events is activity-specific. The schedule of upcoming events is device-specific. A user navigates and selects an event from the schedule of upcoming events. The server device stores a list of assets required for the client devices to run an application. The server device sends the list of assets to the client devices. The server device sends only requested assets for each client device of the client devices. The server device compares the list of assets with a list of client assets after each client device of the client devices sends the list of client assets to the server device. The server device sends only assets in the list of assets that are not in the list of client assets for each client device of the client devices.

DETAILED DESCRIPTION OF THE PREFERRED EMBODIMENT

Figure 1:
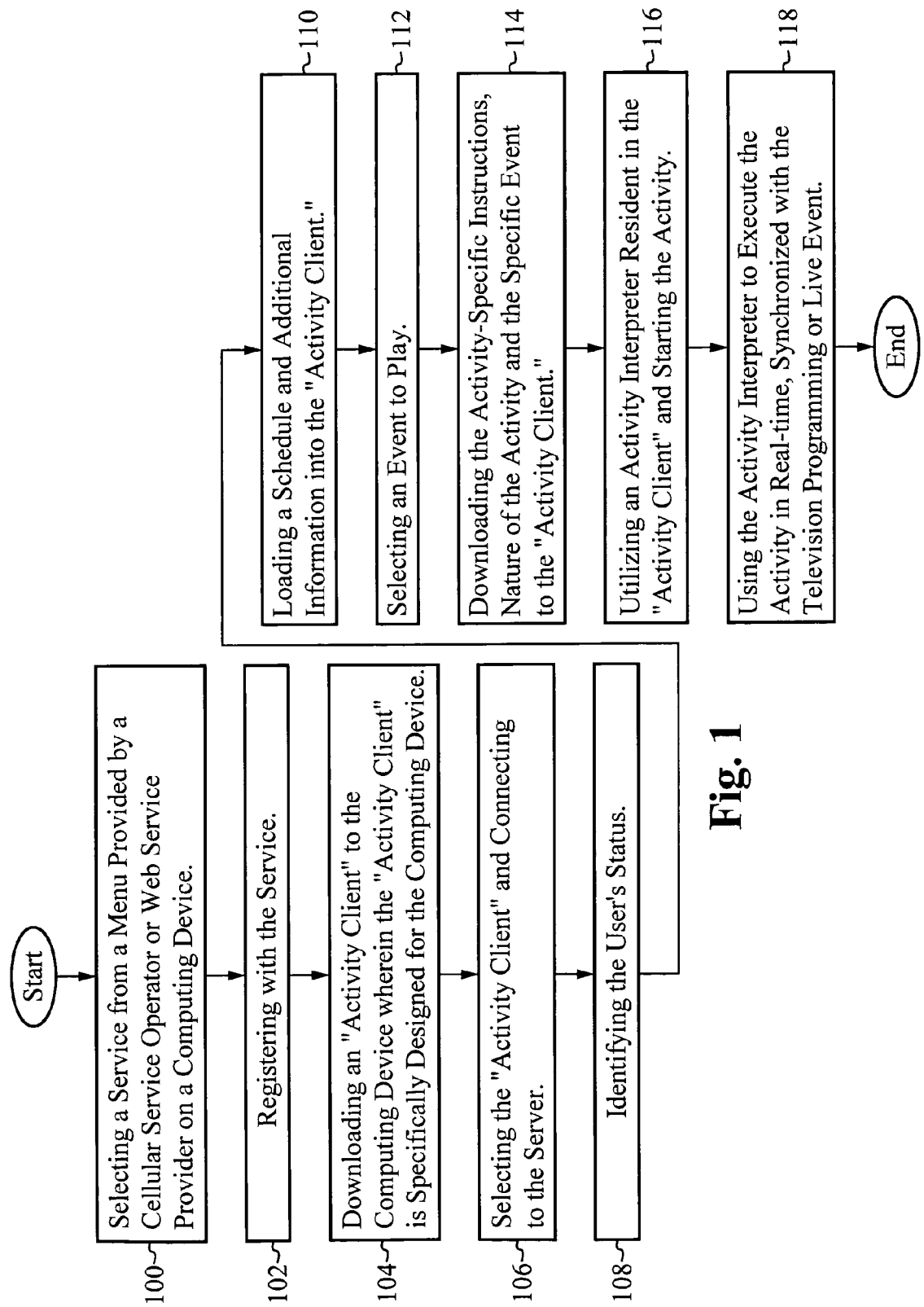
FIG. 1 illustrates a flowchart of an embodiment of utilizing an "Activity Client" to ensure a cell phone or other computing device is properly configured.

A system for and method of implementing a nationwide entertainment service on computing devices and handling the issues described above are described herein. In some embodiments, the entertainment service is subscription-based. The computing devices include, but are not limited to, set-top boxes, personal computers, gaming consoles, laptop computers, cell phones, PDAs and combination devices such as cell phone/mp3 players.

There are over 200 separate television programming areas across the country. The programming offerings available depend on each individual's physical location. There are hundreds of different printed versions of the "TV Guide," and the same television programs will be viewed at different times and on different television channels depending on what Designated Market Area (DMA) a consumer is located in. Thus, the schedule of events for one person might be entirely different from another person located just a few miles away. Monthly and trial subscribers must be informed in advance which television programs will have games or other activities offered by the service concurrent with their telecast. For example, Jeopardy might start at 4 PM ET on Channel 7 in San Francisco, but in Chicago it starts at 6 PM ET on Channel 5, and 7 PM ET on Channel 13 in New York.

Furthermore, the schedules are continuously changing. The activity schedule changes often and must be updated by adding new activities as well as dropping activities which are based on TV programs that have finished airing or are too far into the program to allow entry.

Immediate entry into activities is also required, since time is of the essence in getting all of the required information processed and downloaded to the client. Moreover, since many contests or competitions are of short duration, a competitor might be put at a disadvantage if opportunities to earn points which determine the winners of prizes are missed at the start of the contest, therefore users must be permitted entry possibly seconds before the beginning of a contest, specifically a TV program-based contest. For other activities, such as surveys, time is not necessarily of the essence, but it is still beneficial to users, if they do not have long wait times before participating in an activity. As is described further below, an improved method is described to ensure users have the necessary components of the activity application residing in the memory of the cell phones or computing devices in time to play an activity from its beginning.

The legality of awarding prizes is based on 50 separate state laws. For example, Nevada and Utah have very different gaming laws. When games of skill are offered, each state's laws will define what constitutes a legal game of skill. The same game playable for prizes by a user at one location is not necessarily legal for a user across a state line which might be across the street. It is incumbent upon the entertainment service operator to abide by the laws in each of the jurisdictions where it has users.

Different software is occasionally needed for different makes and models of computing devices such as cell phones. A nationwide entertainment service has a universe of potential users who will utilize a wide variety of makes and models of cell phones. Many of these devices will have different capabilities and requirements regarding display, memory, user interface, and other technical requirements to operate the software necessary to provide such an entertainment service. Therefore, slightly different software is likely required for each separate make and model of a user's device.

A typical subscriber is able to play dozens of different TV-related activities in a week, including football, baseball, Wheel of Fortune™, The Apprentice™ and others. Most makes and models of cell phones have significant limitations on the amount of useable memory for storing downloadable application software. Therefore, a subscriber's cell phone should not be expected to hold in the temporary or permanent memory all of the software capable of running dozens of separate and discreet activity applications which might be offered by such an entertainment service. Minimizing and managing the amount of memory required to fully enjoy the entertainment service is essential.

The present invention utilizes a software application, referred to as an "Activity Client." The "Activity Client" is retained in a user's computing device's memory. A variety of methodologies are implemented for downloading the "Activity Client" into memory of the cell phone or other computing device utilized. In an embodiment, the "Activity Client" is preloaded prior to purchase by a manufacturer or carrier. In an alternative embodiment, in order to initiate the service, a subscriber once registered, selects the company's "Activity Client" from a menu on the cell phone or other computing device from a list of activities, games and other entertainment services offered by a wireless service provider such as Verizon™ Wireless or Sprint™. In some embodiments, if the activity is to be participated other than on a trial basis, registration and billing arrangements with the service will be accomplished either on the company's internet site, or by inputting registration information utilizing the cell phone or other computing device.

Upon selecting the company's service from this menu, a data connection is made to either the cellular service provider or the company's server, and the "Activity Client" is downloaded to the user's cell phone or other computing device. An example protocol implemented is TCP. In the cell phone embodiment, the process of downloading the "Activity Client" is similar to the current methods whereby discrete cell phone activities are selected, downloaded, and previewed or purchased.

In some embodiments, the downloaded "Activity Client" resides in the cell phone's compact flash memory. When the user subsequently launches the "Activity Client" on his/her cell phone or other computing device, a data connection is made to a server. After the user is authenticated and their entitlement level has been determined, the authorized and geographic-specific schedule of events is sent down to his/her phone. Using this approach, the schedule is continuously updated while the "Activity Client" is active.

The "Activity Client" in its default mode, utilizes the LCD on the cell phone to display the entertainment beginning with the next scheduled activities yet to start, generally on the half hour. Since the registration process provides the service provider with the make and model of each user's phone, all "Activity Client" downloads are specific for that phone and service. Thus, for example, if a user downloads the "Activity Client" to his Samsung phone on a Verizon Wireless network, subsequent downloads to that phone will function properly as they are specifically designed for that phone.

To address the issue of numerous programming areas across the country, in one embodiment, the legally mandated ability of the cellular networks to accurately identify the physical location of every cell phone is utilized. Alternatively, and when using computing devices other than a cell phone, other information is utilized to locate the user, such as area code, zip code, or the billing address provided by the user. Based on the information acquired or provided, the server selects the specific schedule of activities, along with start times and TV channel designation for the location for this particular user. The scheduling information is downloaded into a template residing in the "Activity Client." For example, a user located in the Indianapolis, Ind. television DMA might receive a schedule which includes 9:00 pm Monday Night Football, ABC, Channel 13.

In an alternative embodiment, another methodology is utilized wherein specific scheduling information is continually broadcast to all of the users' phones, either utilizing SMS messages to "wake" the phone or, by utilizing a 3 G "always on" multicast to update the schedule continually without user intervention, as long as the user's telephone is powered on.

The server, when determining the location of the cell phone, also accesses information concerning each specific activity offered as to whether or not it has been determined that the activity meets the applicable state law requirements of the game of skill for each particular participant. The user is then informed as to whether or not a prize will be offered to the competitors in this activity from their location.

In addition to containing software for enabling the continual receipt and updating of schedules and activity playing information specific to each user's geographic location, the "Activity Client" has the ability to receive and hold downloaded activity-specific data instructions from the server. Thus, when a specific activity is selected for play by the user, for example, Monday Night Football™, Wheel of Fortune™, or Major League Baseball™, the server downloads the activity-specific instructions into a memory space provided for this purpose in the "Activity Client." These activity-specific data instructions are based on the specific genre such as football, specific event such as San Francisco 49ers vs Dallas Cowboys and the specific computing device such as a wireless mobile device such as Sanyo™ 4300. Thereafter, the specific activity instructions temporarily reside inside the "Activity Client" until the next activity playing session, where it is replaced by different activity-specific data instructions selected by the user.

In an alternative embodiment, the system described herein is used to schedule and control duplicate activities of skill or chance with a common scheduled start time, played simultaneously, which are self contained, for example, not related to a television program. Examples of such include a trivia game, or classic card, dice, word games or games based on television clips.

FIG. 1 illustrates a flowchart of an embodiment of utilizing an "Activity Client" to ensure a cell phone or other computing device is properly configured. In the step 100, a user selects from a menu provided by his web service provider or cellular service operator, for example, Verizon Wireless™, Cingular™, or Sprint™, the TV related subscription service or other service. In the step 102, the user registers with the subscription service when necessary. For some activities, registration is required, but for others, registration is optional or not even available. After registration, if necessary, the user receives a downloaded "Activity Client" into his cell phone or other computing device, specific to the device's make and model in the step 104. In the step 106, to access the entertainment service, the "Activity Client" is selected by the user from the menu, and the device connects via the cellular network and/or internet to the service provider's server. Alternatively, after the "Activity Client" is downloaded, the device automatically connects to the server. In the step 108, the server identifies the user's status as a "trial" subscriber, "ad hoc" competitor, or "full monthly" subscriber, and identifies the specific geographic location of the user. In the step 110, a current schedule of all available events, by name of event, TV network and channel offered, duration of event, and the nature of the prize, and where appropriate, information that indicates that the activity is able to be played for a prize in the user's locale or not, is loaded into the "Activity Client" and displayed on the device's LCD. In an alternative embodiment, once the "Activity Client" is resident on the user's device, scheduling information is continually "pushed" or "broadcast" and passively received and updated on the "Activity Client" so that it is instantly accessed, current and up to the minute. In the step 112, the user selects the event he/she desires to play along with from a variety of possibilities presented on the device. In the step 114, the "Activity Client" software connects to the company's server, and the activity-specific instructions for a specific device, the nature of the activity, and the specific event are downloaded into the "Activity Client." In the step 116, the "Activity Client" then utilizes the activity interpreter resident in the "Activity Client" and starts the activity application. In the step 118, the activity interpreter that resides in the "Activity Client" combines the activity, event, and device instructions and uses these data instructions to execute the activity application as it unfolds in real-time, synchronized with the television programming or live event being viewed by the user.

Additionally, managing different types of software assets or components required by different models of computing devices such as cell phones offered by a variety of cellular carriers or web service providers is described herein. To successfully participate in an activity of skill, based on a television show or live event, a user's cell phone needs specific software to manage, for example, the images displayed on the LCD display, the sound effects utilized by the activity, the activity scripts, the advertising copy and images which are displayed interstitially during the activity, and event-specific data generated in real-time and synchronized with the unfolding of a television show or live event. Complexity is further compounded by the fact that the assets change in minor or major part from activity to activity. For example, from football to baseball to Jeopardy™, there are changes to these assets. Some cellular phones are able to retain some or all of the assets in the phone's memory if the activity to be played was the last activity partaken by a user. Other phones retain some or part of the assets which are common to different genres of activities. Yet other phones retain none of the assets. For example, a first time user or frequent user whose assets were replaced by an upload for a different genre of activity would likely have none of the assets.

Regardless of what type of device is used and on whichever service, the present invention ensures that the application in each user's device receives all of the specific assets necessary for that particular genre of activity for a specific scheduled event while minimizing capacity and latency issues by assuring that only the necessary assets which are not resident on the device for the event are delivered on a timely basis to each cell phone. By using an implementation that only sends necessary missing data, less information needs to be transferred therefore there is less traffic congestion, and users are able to receive the necessary components on time.

Although a cell phone is used in the example above, the present invention is not limited to cell phones. As described above and below, the present invention is applicable to a variety of computing devices in addition to cellular telephones.

Figure 2:
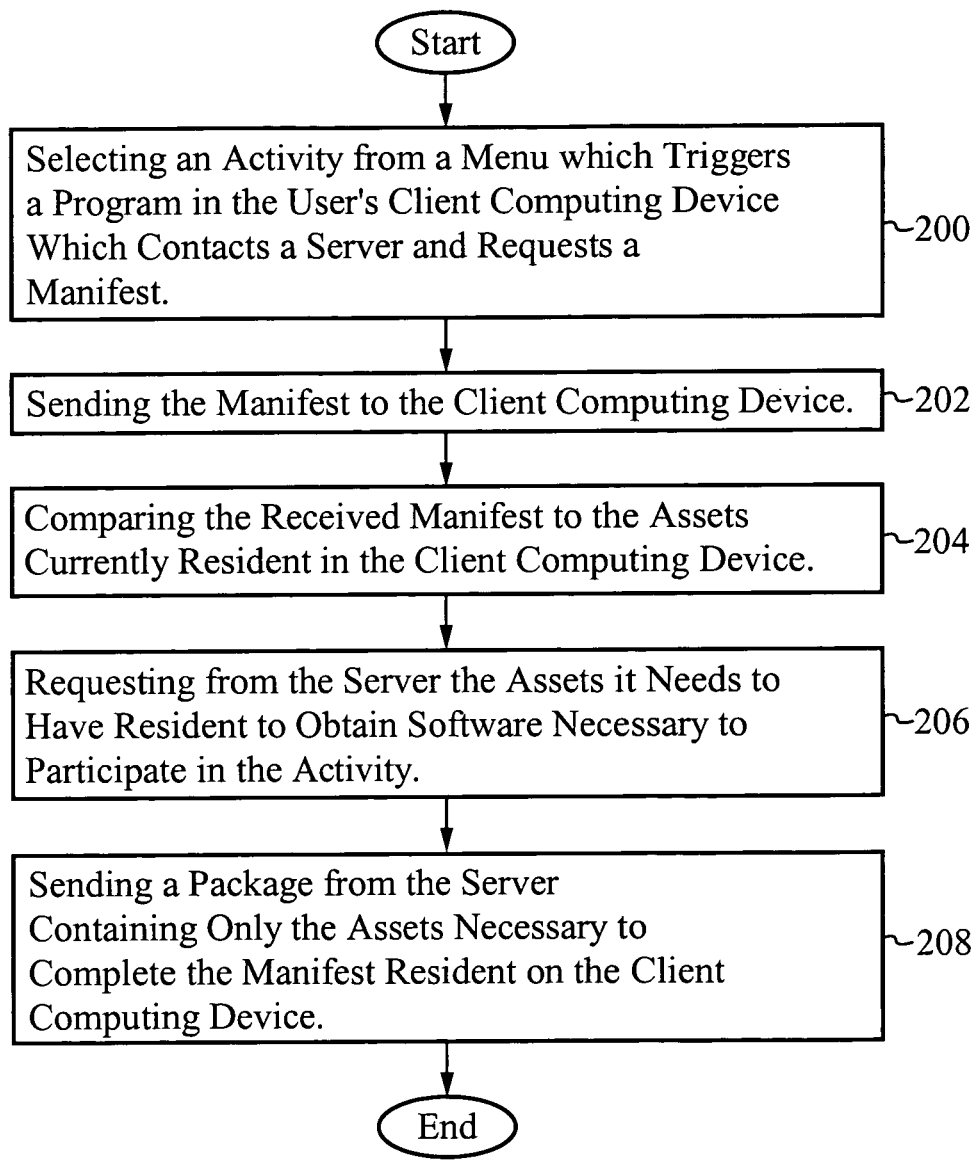
FIG. 2 illustrates a flowchart of an embodiment of implementing a manifest to determine needed assets for a client computing device.

FIG. 2 illustrates a flowchart of an embodiment of implementing a manifest, which is a list of assets, to determine needed assets for a client computing device. In the step 200, a user selects an activity from a menu which triggers a program in the user's client computing device which contacts a server and requests a manifest of assets, from the server, that are required to participate in a specific interactive event. The server then sends the manifest to the client, in the step 202. In the step 204, the client then compares the received manifest to the assets currently resident in the computing device. The client then requests from the server the assets it needs to have resident in the client to obtain a full compliment of required software necessary to participate in the activity, in the step 206. The server then sends a package containing only the assets necessary to complete the manifest resident on the client computing device in the step 208.

Figure 3:
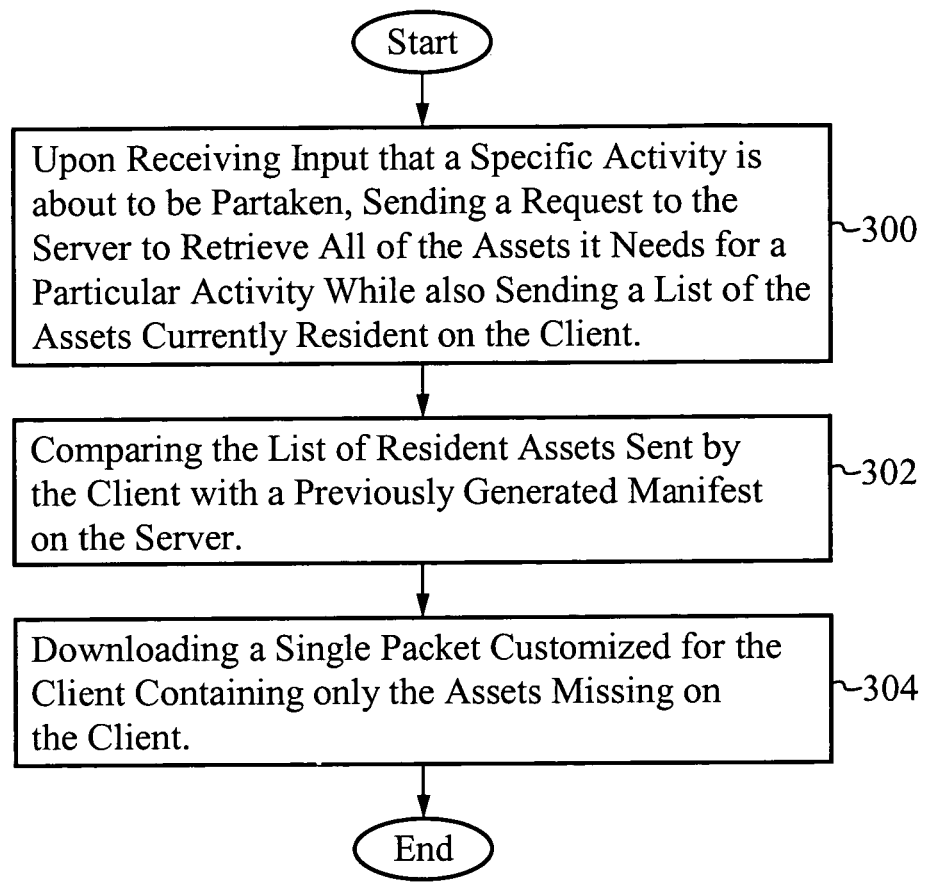
FIG. 3 illustrates a flowchart of an alternative embodiment of implementing a manifest to determine needed assets for a client computing device.

FIG. 3 illustrates a flowchart of an alternative embodiment of implementing a manifest to determine needed assets for a client computing device. Upon receiving input that a specific activity is about to be undertaken, the client sends a request to the server to retrieve all of the assets it needs for a particular activity while also sending a listing of the assets currently resident on the client, in the step 300. The server having previously generated the manifest for the event, then compares the list of resident assets sent with the request in the step 302, and then downloads a single packet customized for the client containing only the assets missing on the client, in the step 304.

Figure 4:
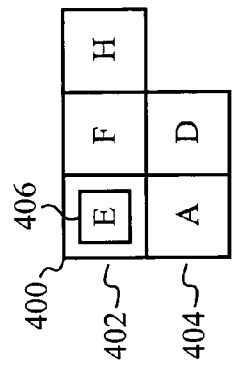
FIG. 4 illustrates an exemplary manifest of the present invention.

FIG. 4 illustrates an exemplary manifest of the present invention. Assets listed in a manifest 400, range in necessity from those that are absolutely required to those that are preferable. To further improve efficiency when delivering components to a user's computing device, the manifest 400 is able to prioritize the assets for the client device to resolve. In some embodiments, the manifest groups the assets into two sets of assets: a first set 402 of required assets and a second set 404 of preferable assets. Furthermore, the assets within each group are able to be ordered utilizing priorities ensuring that the most important assets in the group are first. For example, the server sends the following list of assets required for an event—A, D, and (E, F and H). The assets (E, F and H) are grouped in the response so that the client knows that at least one of them is necessary for the client to join the event. Additionally, the order in which the assets are listed is able to provide additional information to the client device about their priority. For instance, in the example above, the asset E is the most preferred asset 406, then F and finally H within the first set 402 of required assets. If the client has none of the assets, it is able to only request E, depending on the current constraints such as time remaining before the start of the event, the size of the memory on the client device and other similar considerations. Although the manifest used in the example above only has two levels and five total assets, the size of the manifest is able to be modified as desired. If three levels of groupings are preferred, then that hierarchy is able to be implemented. Furthermore, more or less than five assets are able to be included within the manifest, as appropriate.

By minimizing the amount of temporary memory utilized for each application in the client, the time necessary to load the software to play an event is decreased, and the memory of each client is used more efficiently. Thus, the server is able to minimize this overhead by only sending the assets which the client specifically needs for a specific application at a specific time. In one embodiment, the client is provided flexibility in terms of managing the assets it needs for the activities. In another embodiment, the processing that needs to be performed by the client is minimized.

Figure 5:
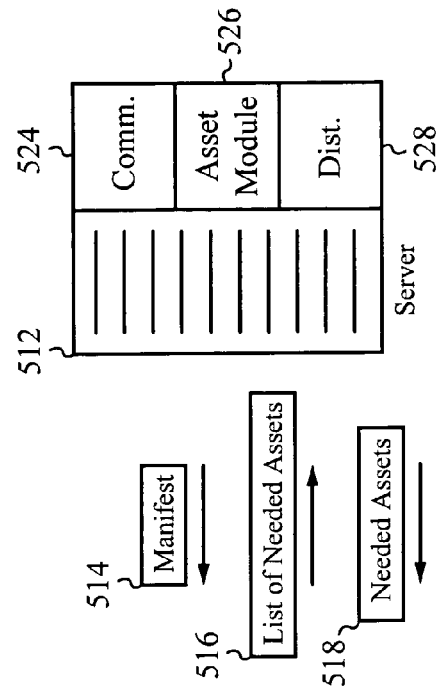
FIG. 5 illustrates a block diagram of an embodiment of the present invention.
Figure 5:
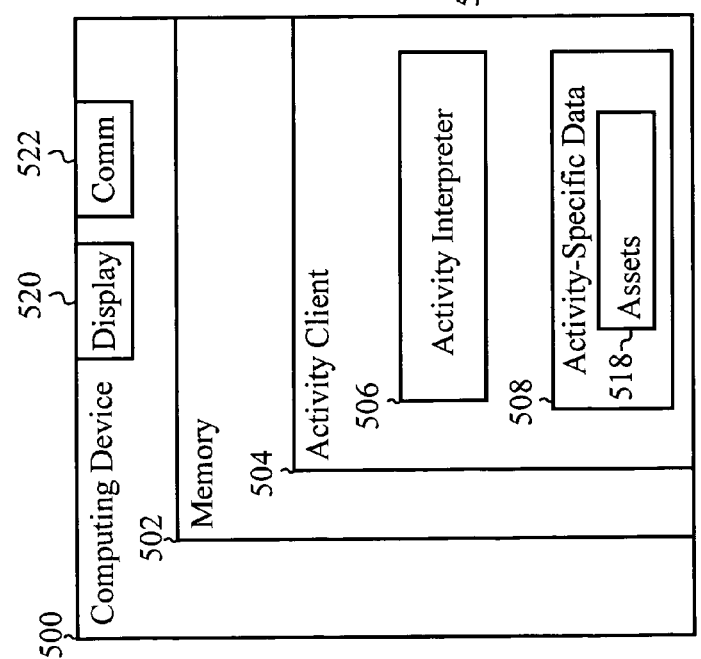

FIG. 5 illustrates a block diagram of an embodiment of the present invention. A computing device 500 such as a set-top box, personal computer, gaming console, laptop computer, cell phone, PDA or combination cell phone/mp3 device includes a memory 502 for storing data. As described above, the memory 502 varies in size depending on the type and brand of computing device, where more recently produced computing devices have larger memories and are thus able to store more data. However, older computing devices only store a minimal amount of data. Within the memory an "Activity Client" 504 is stored for receiving activity-specific data 508. The activity-specific data 508 includes instructions for a specific computing device, the nature of the activity and the specific event. By utilizing a manifest 514 received from a server 512, wherein the manifest 514 includes assets for running the activity, the computing device 500 is able to efficiently retrieve the activity-specific data 508. A list of needed assets 516 by the computing device 500 is sent from the computing device 500 back to the server 512. Then, the necessary assets 518 are downloaded to the memory 502 of the computing device 500. An activity interpreter 506 within the "Activity Client" utilizes the activity-specific data 508 to start the activity application by combining the activity, event and device instructions and executing the activity in real-time. The computing device 500 also includes a display 520, a communication interface 522 and other standard components necessary for proper functionality. The server 512 also includes a communications interface 524 for communicating with the client device 500, an asset module 526 for determining which assets the client device 500 needs and a distributing module 528 for sending the assets needed to the client device 500.

The present invention is applicable to any communicating computing devices such as set-top boxes, personal computers, gaming consoles, laptop computers, cell phones, PDAs and combination devices such as cell phone/mp3 players. The computing devices must have access to a network, but are able to be wired or wireless. The computing devices also are able to be mobile or stationary. Furthermore, the network is able to include a cellular network, a web-based network or any other information sharing network.

The activities that are able to be participated in utilizing the present invention include, but are not limited to, games, polls, surveys, and other interactive activities.

In one specific embodiment, a user utilizes a wireless device, such as a cell phone to subscribe to an interactive gaming service. The user then registers with the service and downloads an "Activity Client" into the cell phone where the "Activity Client" is specifically configured for that type of cell phone. Then, the cell phone connects through the cellular network and Internet to a game server. The game server identifies the user's status including the specific geographical location. A current schedule of all available events, by name of TV event, identification of the game to be played with the TV event, TV network and channel offered, duration of event, and the nature of the prize is then downloaded to the "Activity Client." After a user views the schedule and other information, the user is able to select the event they want to play along with. Then, the "Activity Client" connects to the game server and game-specific data is downloaded. In instances where some of the game-specific data is already downloaded in the cell phone's memory, only those assets that are not already there are downloaded. Preferably, necessary assets are downloaded first and then preferred assets are downloaded. This ensures that a user will be able to play along with the game on time. Then, the "Activity Client" utilizes the game interpreter resident to start the game. The game interpreter also combines the game, event and device instructions to execute the game in real-time while synchronized with the television programming.

The present invention is also intended to apply to any kind of application software which utilizes a variety of assets, where some of the assets are maintained on a remote server such as playing video games, listening to music and web browsing.

To utilize the present invention, a user has a computing device, such as a cell phone, or other appropriate computing device with which he is able to subscribe to an interactive entertainment service. The user then registers with the service and downloads an "Activity Client" into the computing device where the "Activity Client" is specifically configured for that type of device. Then the computing device connects through to a server. The server identifies the user's status including the specific geographical location. A current schedule of all available events, by name of TV event, identification of the activity to be played with the TV event, TV network and channel offered, duration of event, and the nature of the prize is then downloaded to the "Activity Client." After a user views the schedule and other information, the user is able to select the event they want to play along with. Then, the "Activity Client" connects to the server and activity-specific data is downloaded. In instances where some of the activity-specific data is already downloaded in the computing device's memory, only those assets that are not already there are downloaded. Preferably, necessary assets are downloaded first and then preferred assets are downloaded. This ensures that a user will be able to play along with the activity on time. Then, the "Activity Client" utilizes the activity interpreter resident to start the activity. The activity interpreter also combines the activity, event and device instructions to execute the activity in real-time while synchronized with the television programming.

In operation, a user is able to use his cell phone or other computing device to enjoy interactive entertainment. For example, the user scrolls through the menus and selects the interactive entertainment desired to be played. Thereafter, downloads occur, and instructions and options are displayed on the display so that a user is able to read about and determine which interactive entertainment he wants to play. After selecting the activity, again further downloads occur to ensure the proper components are installed on the user's computing device. For example, if it is a Sunday afternoon at 12:50 PM PT, and a user in San Francisco, Calif. sees that the San Francisco 49ers are playing the Oakland Raiders at 1:00 PM PT, he is able to select that activity to play. The user also watches the activity on television. In other embodiments, the activity is watched on other devices such as a computer, the cell phone or computing device itself, or live. At 1:00 PM PT, when the activity starts, the user is able to interactively play along with what he is viewing by predicting aspects of the activity.

Although a cell phone has been used throughout the present specification as the main exemplary computing device, it should be understood that any computing device is able to be used within the described method and system.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of implementing an entertainment service on computing devices comprising:
   a. selecting and registering with a television-related service;
   b. downloading an activity client to a computing device;
   c. loading a set of event information related to the location of the computing device to the activity client from the television-related service, wherein the location determines the set of event information to be loaded;
   d. selecting an event to participate in by a user from a presented list of possible events constructed from the set of event information;
   e. downloading a set of activity-specific information related to an activity from a server to the computing device including:
      i. receiving a list of assets from the server;
      ii. comparing the list of assets with a first set of assets on the computing device; and
      iii. receiving only a second set of assets within the list of assets that are not already resident on the computing device; and
   f. executing an application corresponding to the event on the computing device, wherein the application is selected from the group consisting of a game, a survey and a poll.

2. The method as claimed in claim 1 wherein the activity client is a program for managing activity information and data.

3. The method as claimed in claim 1 further comprising identifying a user status.

4. The method as claimed in claim 3 wherein identifying the user status includes identifying a geographic location of the computing device.

5. The method as claimed in claim 1 wherein the activity client is specifically designed for the computing device.

6. The method as claimed in claim 1 wherein executing the application is in real-time, synchronized with the event.

7. The method as claimed in claim 1 wherein the set of event information includes a schedule of available events.

8. The method as claimed in claim 7 wherein the schedule of available events includes a name of a television event, identification of an activity to be played with the television event, a television network and local channel offering the television event, a duration of the television event and information relating to nature of a prize related to the television event.

9. The method as claimed in claim 1 further comprising displaying the set of event information.

10. The method as claimed in claim 1 wherein the set of event information is continually broadcast from the server and received at the computing device.

11. The method as claimed in claim 1 wherein the set of activity-specific information includes activity-specific instructions and information related to nature of the activity and event.

12. The method as claimed in claim 1 wherein an activity interpreter resident in the activity client is used to execute the application.

13. The method as claimed in claim 12 wherein the activity interpreter combines activity, event and device instructions to execute the activity in real-time.

14. The method as claimed in claim 1 wherein the computing device is a wireless device.

15. The method as claimed in claim 1 wherein the computing device is selected from the group consisting of a set-top box, a personal computer, a gaming console, a laptop computer, a cell phone, a PDA and a combination device.

16. The method as claimed in claim 1 further comprising improving efficiency by prioritizing the second set of assets.

17. The method as claimed in claim 16 wherein the second set of assets are grouped into a set of necessary assets and a set of preferred assets.

18. A method of implementing an entertainment service on computing devices comprising:
   a. selecting and registering with a television-related service;
   b. selecting an activity client from a set of activity clients based on identification data of a computing device;
   c. downloading the activity client to the computing device;

d. loading a set of event information related to the location of the computing device from the television-related service into a template residing in the activity client;

e. selecting an event to participate in from a list of possible events;

f. downloading a set of activity-specific information related to an activity from a server to the computing device, wherein the set of activity-specific information is grouped into a first group of required assets and a second group of preferable assets, wherein assets in each of the first group and the second group are prioritized; and g. executing an application corresponding to the event on the computing device, wherein the application is selected from the group consisting of a game, a survey and a poll.

19. A method of implementing an entertainment service on computing devices comprising:

a. selecting and registering with a television-related service;

b. downloading an activity client to a computing device;

c. loading a set of event information to the activity client from the television-related service;

d. selecting an event to participate in from a list of possible events;

e. a downloading a set of activity-specific information from a server to the computing device, wherein the set of activity-specific information is grouped into a first group of required assets and a second group of preferable assets, wherein assets in each of the first group and the second group are prioritized, and wherein the first group of required assets is downloaded before the event begins; and f. executing an application corresponding to the event on the computing device, wherein the application is synchronized with television programming, and further wherein the application is selected from the group consisting of a game, a survey and a poll.

20. The method as claimed in claim 19 further comprising identifying a user status including identifying a geographic location of the computing device.

21. The method as claimed in claim 19 wherein executing the application is in real-time, synchronized with the event.

22. The method as claimed in claim 19 wherein the computing device is a wireless device.

23. The method as claimed in claim 19 wherein the computing device is selected from the group consisting of a set-top box, a personal computer, a gaming console, a laptop computer, a cell phone, a PDA and a combination device.

24. The method as claimed in claim 19 wherein the event includes an activity of skill.

25. The method as claimed in claim 24 wherein prizes are awarded to winners of the activity of skill.

26. The method as claimed in claim 19 wherein the activity-specific information includes advertising.

27. The method as claimed in claim 19 wherein the event is watched on a user's wireless device.

28. A method of implementing an entertainment service on computing devices comprising:

a. selecting and registering with a television-related service;

b. downloading an activity client to a computing device;

c. loading a set of game information from the television-related service related to the location of the computing device to the activity client, wherein the location determines the set of game information to be loaded;

d. selecting a game to participate in by a user from a presented list of possible games constructed from the set of game information;

e. a downloading a set of activity-specific information related to an activity from a server to the computing device; and f. executing an application corresponding to the game on the computing device, wherein the application is selected from the group consisting of a game, a survey and a poll.

* * * * *